J. J. FRANK.
THREE PHASE TRANSFORMER.
APPLICATION FILED APR. 18, 1908.

963,132.

Patented July 5, 1910.

WITNESSES:
Lester H. Fulmer.
J. Ellis Glen.

INVENTOR
JOHN J. FRANK.
BY
ATTY.

UNITED STATES PATENT OFFICE.

JOHN J. FRANK, OF SCHENECTADY, NEW YORK, ASSIGNOR TO GENERAL ELECTRIC COMPANY, A CORPORATION OF NEW YORK.

THREE-PHASE TRANSFORMER.

963,132.  Specification of Letters Patent.  Patented July 5, 1910.

Application filed April 18, 1908. Serial No. 427,917.

*To all whom it may concern:*

Be it known that I, JOHN J. FRANK, a citizen of the United States, residing at Schenectady, county of Schenectady, State of New York, have invented certain new and useful Improvements in Three-Phase Transformers, of which the following is a specification.

My invention relates to transformers, and more particularly to transformers which are used in connection with three-phase alternating current systems, and has for its object the production of a stable neutral point in such transformers when they have both their primary and secondary windings Y connected.

It has been found that when three single-phase transformers are Y connected to a source of three-phase alternating-current supply, and have their secondaries also Y connected, to translating devices, that the neutral point of such transformers is unstable,—that is, the voltage between a line-conductor and the neutral point is not necessarily equal to the voltage across two line-conductors divided by the square-root of three. This phenomenon may also occur with three-phase transformers under certain conditions, when they have their windings connected with the Y connection. This unstability of the neutral arises from the presence of the third harmonic voltage which exists because of the presence of the transformer core which must be magnetized, and the object of my invention is, by the introduction of an auxiliary winding which is delta-connected, to permit the flow of a short circuit triple harmonic current in this delta connected auxiliary winding and thus reduce the triple harmonic voltage in the legs of the windings to a minimum, and thus the neutral point of the Y-connected windings will become stable. This auxiliary winding is wound so as to be in inductive relation with both the primary and secondary windings, and may consist of a lesser number of turns than either; and also may have less total copper-cross-section, since only the triple harmonic currents need flow in it. This winding may then be considered in the nature of an auxiliary secondary winding, and, if I so desire, I may connect it to translating devices, in which case the copper cross-section would depend upon the capacity of the translating devices, and not alone upon the triple harmonic current induced in the winding.

For a further understanding of my invention reference may be had to the accompanying drawing, where—

Figure 1:
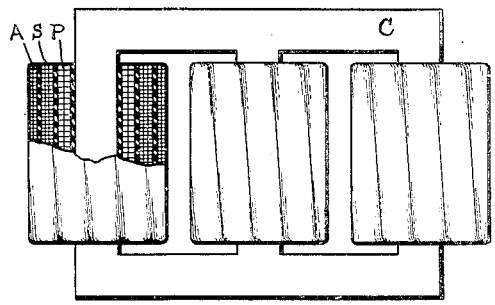
Figure 2:
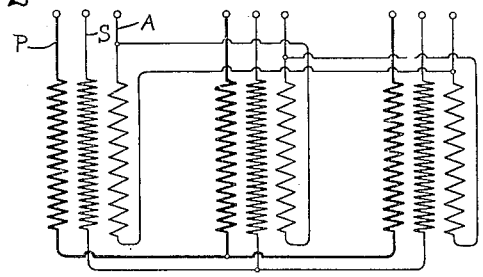
Figure 3:
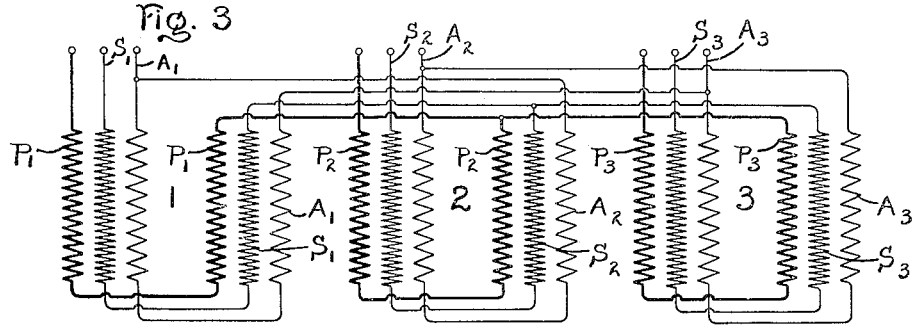

Figure 1 shows somewhat diagrammatically a three-phase core-type transformer having my auxiliary winding, with a portion of one coil shown in section; Fig. 2 shows diagrammatically the connections of a three-phase transformer having my auxiliary winding; Fig. 3 shows diagrammatically the connections for three single-phase transformers having my auxiliary winding; and Fig. 4 shows diagrammatically the relation of the circuits in the transformers.

Referring first to Fig. 2, I have shown a primary winding P and a secondary winding S having a greater number of turns than the primary winding, both windings being Y connected. It will be understood that what I have called primary winding may be the secondary winding, and the secondary winding may be the primary winding, if so desired. I have also shown an auxiliary winding A, which is shown as having a lesser number of turns than either the primary or secondary winding, but this is not necessary to accomplish the object of my invention. This winding is shown as having a delta-connection. Fig. 1 shows a three-phase transformer with a core C having three legs, each wound with a primary winding P, a secondary winding S, and an auxiliary winding A.

Fig. 3 shows diagrammatically three transformers 1, 2, 3, each having two primary coils $P_1$, $P_2$ and $P_3$, two secondary coils $S_1$, $S_2$, and $S_3$, and two auxiliary coils $A_1$, $A_2$ and $A_3$, the primary and secondary coils being Y connected and the auxiliary coils being delta-connected, the only difference between the Figs. 2 and 3 being that Fig. 2 shows a three-phase transformer, whereas Fig. 3 shows three single-phase transformers.

Figure 4:
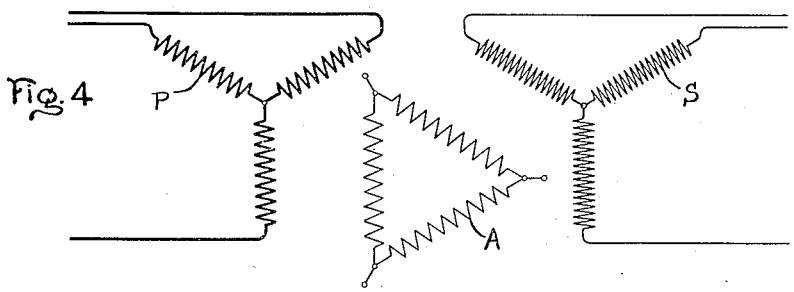

In Fig. 4, I have shown for greater clearness, schematically the relations of the three circuits, the primary winding P being Y connected, the secondary winding S being Y connected, and the auxiliary winding A being delta-connected. While this diagram shows the phase relations of the windings for a three-phase transformer, such as shown in Fig. 2, it will be obvious that it also shows them for three-single-phase transformers, as shown in Fig. 3, if a double coil be substituted for each of the single coils shown in Fig. 4.

As my invention may be used with single-phase transformers connected for the transformation of a three or more phase circuit, for three-phase transformers, or for other arrangements of transformers that will be obvious to those skilled in the art, by the use of the word "device" in the claims I seek to include all transformers or connections of transformers to which my invention may be applied.

While I have shown a certain arrangement and connection of windings, I do not mean to limit myself to the arrangement or connections shown; but endeavor in the appended claims to cover all arrangements and connections which will be obvious to those skilled in the art and are within the scope of my invention.

What I claim as new, and desire to secure by Letters Patent of the United States, is,—

1. The combination with a device transforming from polyphase to polyphase alternating electric current and having its windings star-connected, of an auxiliary closed-circuit secondary winding.

2. The combination with a device transforming from three-phase to three-phase alternating electric current and having its windings Y connected, of an auxiliary delta-connected winding.

3. The combination in a device for three-phase circuits having its primary and secondary windings Y connected, of a third delta-connected winding in inductive relation to the primary and secondary windings.

4. The combination in a device for three-phase circuits having its primary and secondary windings Y connected, of a third delta-connected winding having a lesser total copper cross-sectional area than either of the other windings, and in inductive relation to them.

5. The combination of a device for three-phase circuits having its primary and secondary windings Y connected, of a third delta-connected winding having a lesser number of turns than either of the other windings and in inductive relation to them.

6. The combination in a device for three-phase circuits having its primary and secondary windings Y connected, of a third delta-connected winding having a lesser total copper cross-sectional area and a lesser number of turns than either of the other windings.

7. The combination in a three-phase transformer with a Y connected primary winding and a Y connected secondary winding, of a delta-connected winding having a lesser number of turns than either the primary or secondary windings, and in inductive relation to the primary and secondary windings.

8. The combination in a three-phase transformer with a Y connected primary winding and a Y connected secondary winding, of a delta-connected winding having a lesser total copper cross sectional area and a lesser number of turns than either of the other windings, and in inductive relation to them.

9. The combination in a three-phase transformer with a Y connected primary winding and a Y connected secondary winding, of a delta-connected winding having a lesser total copper cross sectional area and a lesser number of turns than either of the other windings, and in inductive relation to them.

In witness whereof I have hereunto set my hand this 17th day of April 1908.

JOHN J. FRANK.

Witnesses:
HELEN ORFORD,
BENJAMIN B. HULL.